Patented July 5, 1949

2,475,521

UNITED STATES PATENT OFFICE 2,475,521

BENZANTHRONE ACRIDINE DIANTHRIMIDE ACRIDONES

Mario Scalera, Somerville, and Asa W. Joyce, Plainfield, N. J., assignors to American Cyanamid Company, New York, N. Y., a corporation of Maine No Drawing. Application June 1, 1944, Serial No. 538,345

6 Claims. (Cl. 260—276)

This invention relates to new vat dyestuffs containing the benzanthrone acridine dianthrimide acridone ring system.

Compounds of the present invention may be represented by the following formulae:

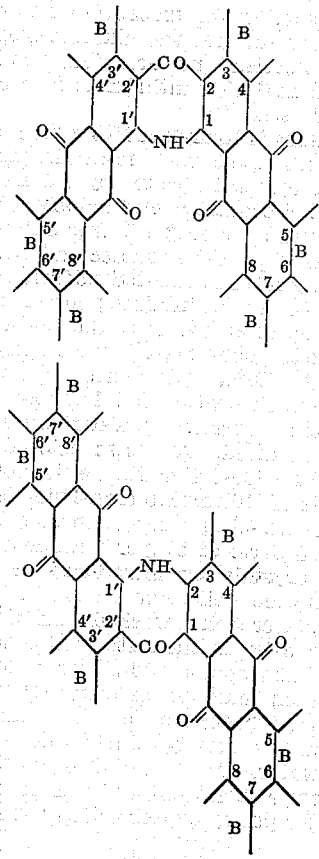

and any one pair of the adjacent positions marked B may be connected to grouping

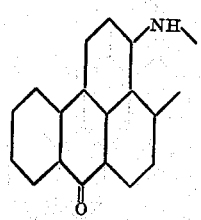

the imino group being attached to an alpha position of the dianthrimide acridone residue.

The present invention is not limited to any particular method of producing the compounds, but we prefer to prepare them by condensing bzl-benzanthronylamino dianthrimide acridones with strongly basic condensing agents such as aqueous or alcoholic potassium hydroxide or sodium anilide in aniline. The reaction is preferably carried out at elevated temperature, for example 150–180° C., the optimum temperature depending to some extent on the condensing agent used.

The new compounds are in general black powders which are hardly soluble in most organic solvents, even at elevated temperatures. They are readily soluble in concentrated sulfuric acid to form brown to olive-green solutions from which the dyestuffs may be recovered in a finely dispersed state by drowning in water and filtering. The products dissolve readily in alkaline hydrosulfite to give violet-brown to blue-brown vats from which cellulosic fibers are dyed dark black-brown to olive shades of excellent fastness.

The bzl-benzanthronyl amino dianthrimide acridones are in themselves new compounds and are described and claimed in our copending application, Ser. No. 538,343, filed June 1, 1944, now Patent Number 2,463,810. In turn, they may be produced from the mono alpha amino dianthrimide acridones described and claimed in our copending application Ser. No. 538,343, filed June 1, 1944. These intermediates are not claimed per se in the present application but only in conjunction with their use as intermediates in the preparation of the products of the present invention.

The invention will be described in greater detail in the following specific examples, the parts being by weight.

*Example 1*

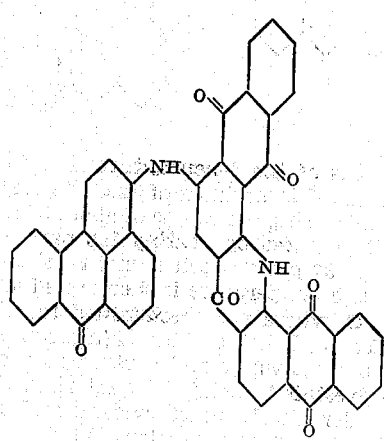

1-amino-4-benzoyl amino anthraquinone is reacted with 1-chloro anthraquinone-2-carboxylic acid benzyl ester in nitrobenzene solution in the presence of sodium carbonate or sodium acetate and a catalytic amount of cupriferous compound. The mixture is heated with agitation for some hours at 185–190° C., cooled to room temperature, diluted with additional nitrobenzene, filtered and the precipitate washed first with nitrobenzene and finally with alcohol. The filter cake is steamed to remove traces of nitrobenzene, slurried in an alkaline slurry, filtered, acidified with hydrochloric acid, again filtered, and washed.

The product, which is 4-benzoyl amino-1,1'-dianthrimide-2'-carboxylic acid benzyl ester is then hydrolyzed with alcoholic caustic potash in the presence of pyridine and water, drowned in hydrochloric acid and water, filtered and washed free of mineral acid. The resulting 4-amino-1,1'-dianthrimide-2'-carboxylic acid is then subjected to ring closure by dissolving in concentrated sulfuric acid, heating to 90° C., and maintaining for several hours. The solution is then diluted to 72% acid strength and cooled. The precipitate which forms is filtered off, boiled in water, filtered, washed acid free and dried. It is 4-amino-1,1'-dianthrimide-2,2'-acridone.

118 parts of the 4-amino-1,1'-dianthrimide-2,2'-acridone and 93 parts of bzl-bromo-benzanthrone are introduced into 1500 parts of nitrobenzene to which 33 parts of soda ash, 4 parts of copper powder and 2 parts of iodine have been added while agitating. The mixture is heated to the boil for about 12 hours, cooled to about 100° C. and filtered. The cake is washed with nitrobenzene and then steamed to remove the nitrobenzene producing a slurry which is acidified, stirred, filtered, and washed free of the acid. It is then dried and constitutes a black body which dissolves in concentrated sulfuric acid with an olive-brown color changing to green on dilution with water. It is capable of dyeing cotton a violet-brown shade from a violet colored bath.

*Example 2*

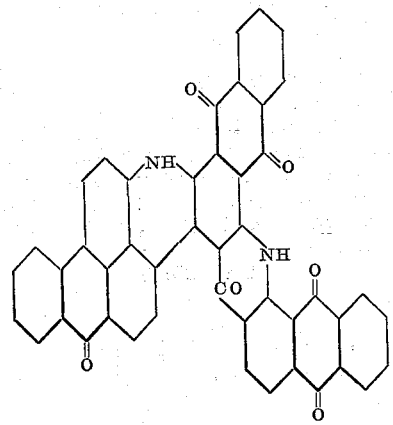

12.0 grams of the 4-benzanthronlyamino-1,1'-dianthrimide-2,2'-acridone of Example 1 are gradually added during the course of about 30 minutes to a melt prepared by heating 150 parts caustic potash and 36 parts absolute methanol at about 160° C. The temperature is then raised to about 175–180° C. where it is maintained for about 2 hours. The melt is then poured in a thin stream into 1,500 parts water and aerated at about 60° C. The dyestuff is isolated by filtering. It is a black powder dissolving in concentrated sulfuric acid with a red-brown color. It dyes cotton from a violet-brown vat olive-gray shades of good fastness.

*Example 3*

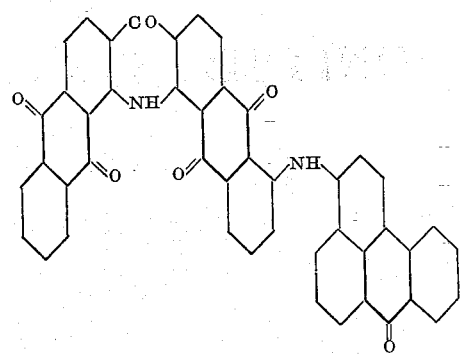

1-benzoyl amino-5-aminoanthraquinone is reacted with 1-chloro anthraquinone-2-carboxylic acid benzyl ester in nitrobenzene in the presence of sodium carbonate or sodium acetate and a small amount of cupriferous compound. The reaction which takes about 6 hours is effected at 185–190° C. On cooling to room temperature a brownish-red product precipitates which is filtered, washed with nitrobenzene and then with alcohol, steamed, and the alkaline slurry again filtered, reslurried and acidified, producing 5-benzoyl amino-1,1'-dianthrimide-2' - carboxylic acid benzyl ester.

The product is hydrolyzed to a free carboxylic acid with alcoholic caustic potash in the presence of pyridine and some water by boiling for some hours. After drowning and acidifying, followed by filtering and washing, the free carboxylic acid is obtained. This is then subjected to ring closure by dissolving in concentrated sulfuric acid, heating to 90° C. and maintaining for several hours. After cooling to about 50° C. the acid concentration is cut to about 71%, the resulting slurry is cooled and filtered. The brick red precipitate obtained is washed with a small amount of 70–71% sulfuric acid, slurried in warm water, filtered, washed and dried. A brown colored 5-amino-1,1'-dianthrimide-2,2'-acridone is obtained.

118 parts of this amino dianthrimide acridone, 81 parts of bzl-bromo-benzanthrone, 33 parts of soda ash, 4 parts of copper powder and 2 parts of iodine crystals are introduced in 1200 parts of nitrobenzene, boiled for about 12 hours, cooled to 100° C., filtered and washed with nitrobenzene. The filter cake is then steamed again filtered and dried and constitutes a brown colored substance which dissolves in concentrated sulfuric acid with an orange color which first turns to a green when carefully diluted with a small portion of water. It dyes cotton a violet-brown shade from a violet vat and can be obtained in still greater purity by extraction with hot nitrobenzene.

*Example 4*

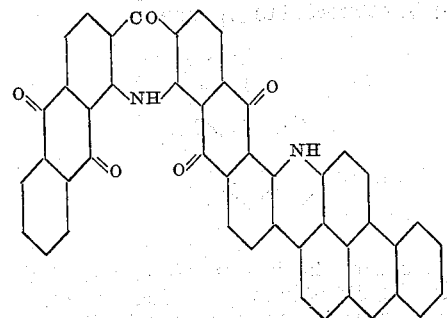

10.0 parts of the 5-benzanthronylamino-1,1'-dianthrimide-2,2'-acridone of Example 3 are introduced during the course of about 30 minutes into a melt prepared by heating 100 parts caustic potash and 22 parts absolute methanol to about 160–170° C. The temperature is now raised to 180–185° C. and maintained at this point for about 2 hours. The smooth black melt is then poured in a thin stream into 1,000 parts water, aerated at about 60° C. and then heated to the boil for a short time. After filtration and washing until free of alkali, it is dried. The dyestuff so obtained is a black powder dissolving in concentrated sulfuric acid with an olive-green color. It dyes cotton fast black-brown shades from a blue-black vat.

*Example 5*

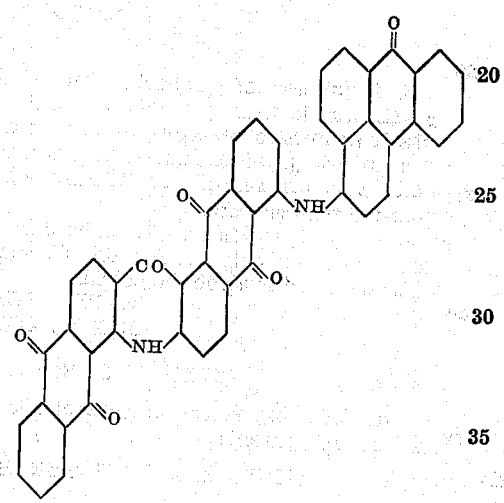

1-benzoylamino-6-chloro anthraquinone is reacted with 1-amino anthraquinone-2-carboxylic acid methyl ester in nitrobenzene in the presence of soda ash and anhydrous sodium acetate, a small amount of copper powder and iodine. The reaction is effected by boiling for some hours and on cooling and filtering 5-benzoylamino-2,1'-dianthrimide-2'-carboxylic acid methyl ester is produced which is hydrolyzed to the free acid by boiling in alcoholic caustic potash and pyridine, filtering and precipitating with hydrochloric acid.

The 5-benzoylamino-2,1'-dianthrimide-2'-carboxylic acid in then subjected to ring closure in concentrated sulfuric acid starting at room temperature and heating up to 95–100° C., followed by precipitation on diluting to 60% sulfuric acid. On filtering, washing with 60% sulfuric acid and then warm water the 5-amino-2,1'-dianthrimide-1,2'-acridone is obtained.

43 parts of this alpha amino dianthrimide acridone, 43 parts of bzl-bromo benzanthrone, 15 parts of soda ash, 3 parts of copper powder and 0.2 part of iodine crystals are introduced into 900 parts of nitrobenzene and the reaction mixture boiled for about 12 hours. It is then cooled to about 110° C. and the precipitate filtered, washed with nitrobenzene and steamed to produce a slurry which is acidified hot, filtered, washed and dried.

The 5-benzanthronyl amino 2,1'-dianthrimide-1,2'-acridone so obtained is a dark brown body dissolving in concentrated sulfuric acid with an orange brown color which changes to green when carefully diluted with a small amount of water. It dyes cotton a reddish-bordeaux shades from a violet-blue vat.

*Example 6*

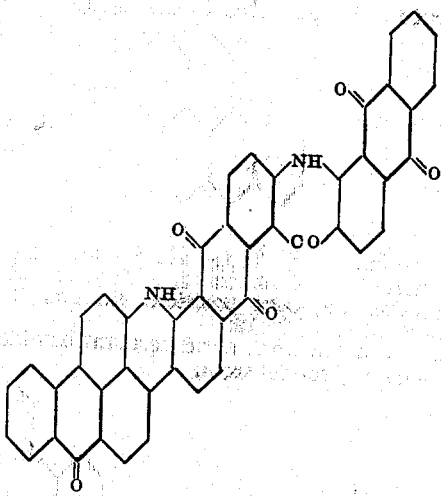

3.8 parts of 5-benzanthronyl amino-2,1'-dianthrimide-1,2'-acridone of Example 5 are gradually added during the course of about 30 minutes to a previously prepared melt of 60 parts caustic potash and 14 parts absolute methanol heated at about 165–170° C. The melt is then further heated for about 3 hours at about 175° C. After drowning in 600 parts water and aerating until completely oxidized, it is worked up in the same manner as described in Example 2. The product is a dark powder dissolving in concentrated sulfuric acid with an olive-green color. Cotton is dyed from a greenish-blue vat strong olive shades of excellent fastness.

We claim:

1. A benzanthrone acridine dianthrimide acridone of the group consisting of those having the formula:

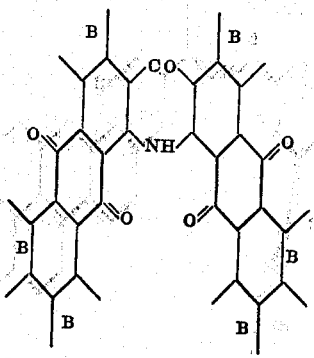

and those having the formula:

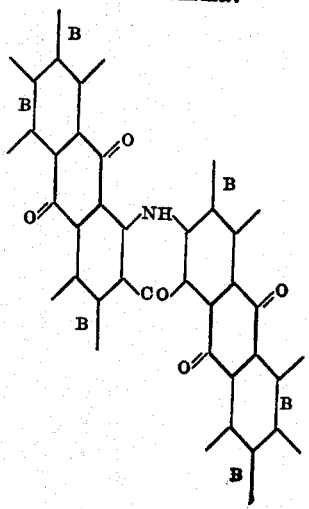

in which only one pair of the adjacent positions marked B is connected to the group

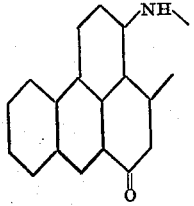

the amino group being attached to an alpha position of the dianthrimide acridone residue and the other adjacent positions marked B being connected to hydrogen.

2. A benzanthrone acridine dianthrimide acridone having the formula:

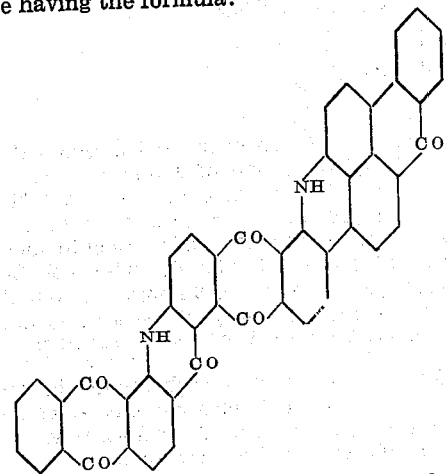

3. A benzanthrone acridine dianthrimide acridone having the formula:

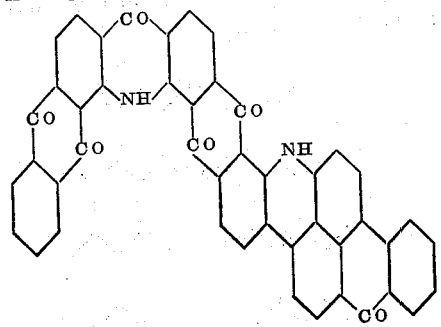

4. A benzanthrone acridine dianthrimide acridone having the formula:

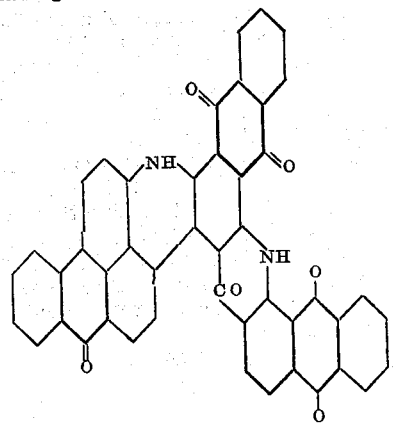

5. A process of preparing an unsubstituted benzanthrone acridine dianthrimide acridone which comprises reacting an unsubstituted bzl-benzanthronyl alpha amino dianthrimide acridone with an alkaline condensing agent at an elevated temperature.

6. A method according to claim 5 in which the temperature is between 150–180° C. and the condensing agent is alcoholic potash.

MARIO SCALERA.
ASA W. JOYCE.

REFERENCES CITED

The following references are of record in the file of this patent:

UNITED STATES PATENTS

| Number | Name | Date |
|---|---|---|
| 1,696,499 | Mieg | Dec. 25, 1928 |
| 1,706,933 | Mieg | Mar. 26, 1929 |
| 1,709,993 | Mieg et al. | Apr. 23, 1929 |
| 2,008,157 | Smith et al. | July 16, 1935 |
| 2,014,790 | Thomson | Sept. 17, 1935 |
| 2,081,874 | Lycan | May 25, 1937 |